(12) United States Patent
Volokh et al.

(10) Patent No.: US 7,959,382 B2
(45) Date of Patent: *Jun. 14, 2011

(54) END MILL FOR ORBITAL DRILLING

(75) Inventors: Vladimir David Volokh, Maalot (IL);
Sergei Vladimir Boulakhov, Nahariya (IL); Leonid Boris Sharivker, Nahariya (IL); Shay Zeidner, Kibutz Cabri (IL); Wangyang Ni, Latrobe, PA (US); Vladimir Galipko, Nahariya (IL)

(73) Assignee: Kennametal Inc., Latrobe, PA (US)

( * ) Notice: Subject to any disclaimer, the term of this patent is extended or adjusted under 35 U.S.C. 154(b) by 277 days.

This patent is subject to a terminal disclaimer.

(21) Appl. No.: 12/356,899

(22) Filed: Jan. 21, 2009

(65) Prior Publication Data

US 2010/0183383 A1 Jul. 22, 2010

(51) Int. Cl.
*B23B 5/10* (2006.01)
*B23B 5/00* (2006.01)

(52) U.S. Cl. .......................... 407/53; 407/54

(58) Field of Classification Search .............. 407/53, 407/54, 59, 61, 62, 63, 30, 34; 408/230, 408/227
See application file for complete search history.

(56) References Cited

U.S. PATENT DOCUMENTS

| | | | |
|---|---|---|---|
| 3,546,761 A * | 12/1970 | Gage | 407/35 |
| 4,341,044 A | 7/1982 | Cross | |
| 4,480,949 A * | 11/1984 | Van De Bogart | 407/54 |
| 4,564,321 A | 1/1986 | Kondo et al. | |
| 5,322,394 A | 6/1994 | Okanishi et al. | |
| 5,709,907 A | 1/1998 | Battaglia et al. | |
| 6,179,528 B1 | 1/2001 | Wardell | |
| 6,997,651 B2 | 2/2006 | Kawai et al. | |
| 7,001,113 B2 | 2/2006 | Flynn et al. | |
| 7,014,394 B2 | 3/2006 | Inglis | |
| 7,094,005 B2 | 8/2006 | Svensson | |
| 7,399,147 B1 * | 7/2008 | VanDyke, Jr. | 407/53 |
| 7,431,538 B1 * | 10/2008 | Ni et al. | 407/53 |
| 2002/0141833 A1 | 10/2002 | MacArthur | |
| 2003/0053870 A1 | 3/2003 | Flynn et al. | |
| 2004/0115434 A1 | 6/2004 | Okamura et al. | |
| 2005/0117982 A1 | 6/2005 | Dov et al. | |

(Continued)

FOREIGN PATENT DOCUMENTS

JP 09309020 12/1997

(Continued)

OTHER PUBLICATIONS

Eric Whinnem, "Development and Deployment of Orbital Drilling at Boeing", SAE Manufacturing and Automated Fastening Conference and Exhibition, 2006.

(Continued)

*Primary Examiner* — Will Fridie, Jr.
(74) *Attorney, Agent, or Firm* — Larry R. Meenan

(57) ABSTRACT

A center or non-center cutting end mill for orbital drilling includes a shank having a shank diameter; a neck having a neck diameter; a cutting head having a cutting diameter; a corner radius; a dish angle; and a longitudinal axis, the cutting head including a forward cutting end having a convexly curved section located between the longitudinal axis and the corner radius, wherein the convexly curved section causes material removed from a workpiece to flow radially outward from an initial contact area toward the corner radius, thereby minimizing the accumulation of material in a central portion of the forward cutting end.

17 Claims, 5 Drawing Sheets

U.S. PATENT DOCUMENTS

2008/0253846 A1   10/2008   Ni et al.

FOREIGN PATENT DOCUMENTS

JP            10225812        8/1998
WO        2006/103649 A2    10/2006

OTHER PUBLICATIONS

Richard Lindqvist and Henrik Kihlman, "Orbital Drilling—Implementation and Evaluation", SAE Manufacturing and Automated Fastening Conference and Exhibition, 2004.

Henrik Kihlman, Ingvar Eriksson, and Mark Ennis, "Robotic Orbital Drilling of Structures for Aerospace Applications", SAE Manufacturing and Automated Fastening Conference and Exhibition, 2002.

H.K. Tonshoff, P. Andrae and C. Lapp, "High-Efficiency Machining of Aerospace-Alloys", SAE Manufacturing and Automated Fastening Conference and Exhibition, 1999.

Frederick Latger, Tom Harris and Stephan Bjorklund, "Drilling Cost Model", SAE Manufacturing and Automated Fastening Conference and Exhibition, 2002.

R. Teti, "Machining of Composite Materials", Annals of CIRP, vol. 51/2, 611-634, 2002.

Ravishankar Iyer, "Helical Milling: An Enabling Technology for Machining Holes in Fully Hardened AISI D2 Tool Steel", Thesis, McMaster University, 2006.

Richard Lindqvist, Ingvar Eriksson, and Mathias Wolf, "Orbital Drilling of Sandwich Constructions for Space Applications", SAE Manufacturing and Automated Fastening Conference and Exhibition, 2001.

Hiroyuki Sasahara, Makoto Kawasaki, and Masaomi Tsutsum, "Helical Feed Milling with MQL for Boring of Aluminum Alloy", No. 02-1213, 6 pages, 2003.

H,K. Tonshoff, T. Friemuth, and M. Groppe, "High Efficiency Circular Milling—A Solution for an Economical Machining of Bore Holes in Composite Materials", Third International Conference on Metal Cutting and High Speed Machining, 2001.

H.K. Tonshoff, T. Friemuth, P. Andrae, and M. Groppe, "Circular Milling Replacing Drilling and Reaming", International Seminar on Improving Machine Tool Performance, 2000.

Bert P. Erdel, "Breakthrough Machining Technology for the Automotive Industry", International Congress & Exposition, 1996.

P. Rahme, Y. Landon, P. Lagarrigue, R. Piquet, F. Lachaud, B. Marguet, J. Bourriquet and C. Le Roy, "Drilling of Thick Composite Structure State of the Art", SAE International, 2006.

\* cited by examiner

END MILL FOR ORBITAL DRILLING

BACKGROUND OF THE INVENTION

The invention relates in general to an end mill for orbital hole drilling, and in particular to an end mill having a forward cutting end with a radiused or convexly curved section that minimizes the accumulation of material from the workpiece to enable smooth drilling of the workpiece material, especially in layered materials without separating the layers.

Orbital drilling is a holemaking operation by milling in which the center of an end mill orbits about the center of the intended hole while spinning on its own axis and moving in the axial direction. Orbital drilling is also known as circular milling or helical interpolation.

Referring now to FIG. 7, a conventional end mill for orbital drilling is shown. The end mill 100 includes has a shank 102, a neck 104, a cutting head 106, and a longitudinal axis 108. In general, the neck diameter 112 is less than the shank diameter 110 and the cutting diameter 114. As shown in FIG. 8, the cutting head 106 includes a forward cutting end 116 that includes a dish angle 118 with respect to the end face. The cutting head 106 also includes a corner radius 120, and a flat 122 that extends from the corner radius 120 to a back radius 124 that causes reduction in diameter from the cutting head 106 to the neck 104.

As shown in FIGS. 9 and 10, a conventional non-center cutting end mill 200 includes four flutes, 202, 204, 206, 208 formed at a helix angle 210. In addition, the end mill 200 includes an end teeth radial rake angle 212, a gashing axial rake angle 214, and a primary clearance angle 216. Typically, the end teeth radial rake angle 212 is approximately equal to a peripheral teeth radial rake angle 218.

During an orbital drilling operation, the cutting head 106 of the end mills 100, 200 first come into contact with the workpiece at an initial contact area 126, 226, respectively, which is proximate the corner radius 120. Because of the dish angle 118, the material being removed by the end mill 100, 200 tends to travel radially inward toward the longitudinal axis 108 and accumulate in a central portion 106a of the cutting head 106. The material also tends to mostly accumulate along the longitudinal axis 108 and accumulate less near the corner radius 120.

As a result of this accumulation of material on the cutting head, the performance of the conventional end mill suffers. Thus, there is a need to provide a cutting tool that minimizes the accumulation of material during an orbital hole drilling operation.

BRIEF SUMMARY OF THE INVENTION

Briefly, according to this invention, there is provided an end mill for orbital drilling comprising a shank having a shank diameter; a neck having a neck diameter; a cutting head having a cutting diameter; a corner radius; a dish angle; and a longitudinal axis, the cutting head including a forward cutting end having a convexly curved section located between the longitudinal axis and the corner radius, wherein the convexly curved section causes material removed from a workpiece to flow radially outward from an initial contact area toward the corner radius, thereby minimizing an accumulation of material in a central portion of the forward cutting end.

In another embodiment, an end mill for orbital drilling comprises a shank having a shank diameter; a neck having a neck diameter; a cutting head having a cutting diameter; a corner radius; a dish angle; a plurality of flutes; and a longitudinal axis, the cutting head including a forward cutting end having a convexly curved section located between the longitudinal axis and the corner radius, wherein the convexly curved section causes material removed from a workpiece to flow radially outward from an initial contact area toward the corner radius, thereby minimizing an accumulation of material in a central portion of the forward cutting end.

BRIEF DESCRIPTION OF THE DRAWINGS

Further features of the present invention, as well as the advantages derived therefrom, will become clear from the following detailed description made with reference to the drawings in which.

DETAILED DESCRIPTION OF THE INVENTION

Figure 1:
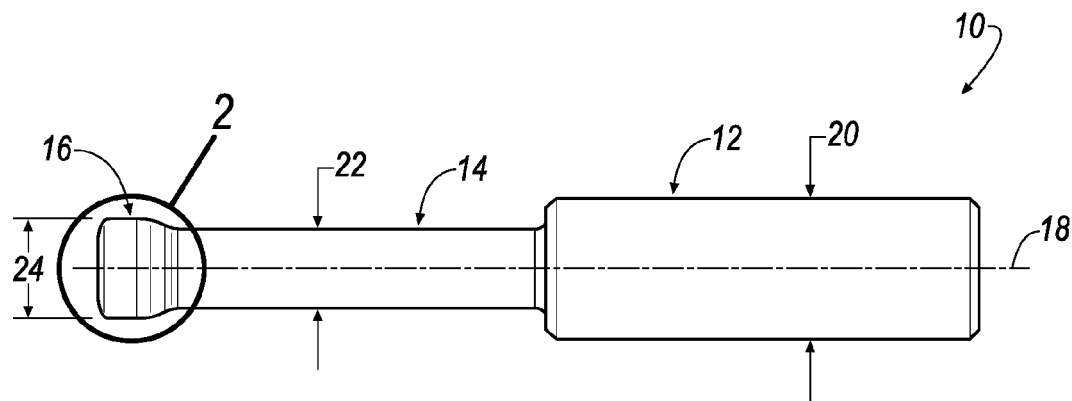
FIG. 1 is a side view of the geometry of an end mill according to an embodiment of the invention.
Figure 2:
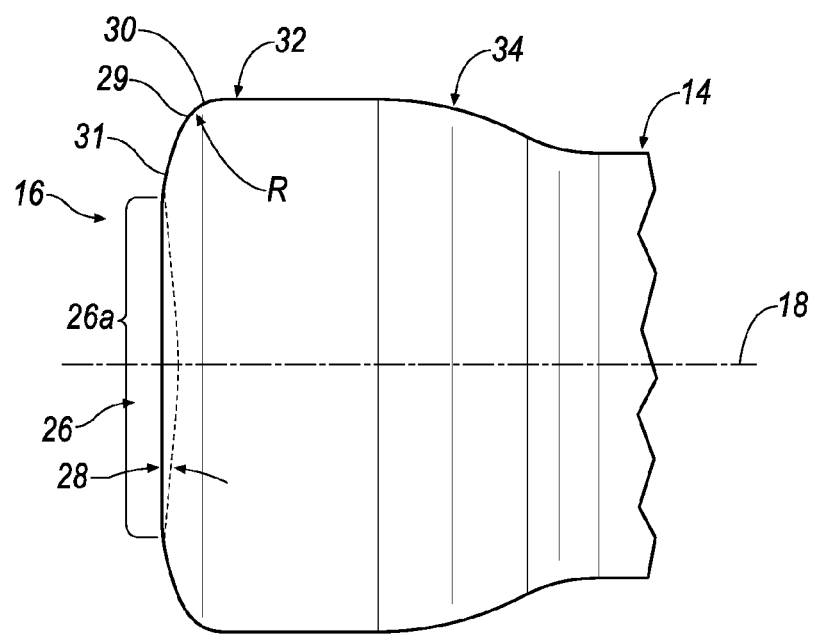
FIG. 2 is an enlarged side view of the cutting head of the end mill of FIG. 1.

Referring to FIGS. 1 and 2, wherein like reference characters represent like elements, an end mill for orbital drilling is generally shown at 10. In general, the end mill 10 includes has a shank 12, a neck 14, a cutting head 16, and a longitudinal axis 18. In one embodiment, the shank 12 has a shank diameter 20 of approximately 0.40 inches (10.16 mm), the neck 14 has a neck diameter 22 of approximately 0.34 inches (8.64 mm), and the cutting head 16 has a cutting diameter 24 of approximately 0.40 inches (10.16 mm), which is approximately the same as the shank diameter 20. In general, the neck diameter 22 is less than the shank diameter 20 and the cutting diameter 24. For example, the neck diameter 22 can be approximately 65 to 90 percent of the shank diameter 20 and the cutting diameter 24.

The end mill 10 can be made of a substrate comprising tungsten carbide (WC) cemented with cobalt (Co) in a range between about 3 wt. % to about 15 wt. %. For improved wear resistance, the substrate can be coated with a wear-resistant material, such as titanium nitride (TiN), Titanium aluminum Nitride (TiAlN), aluminum chromium nitride (ALCrN), diamond, and the like. For example, the substrate can be coated with a diamond coating having a thickness in a range between about 8 to 20 μm. The diamond coating can be deposited using a chemical vapor deposition (CVD) process, and the like. The end mill 10 can also be made of a polycrystalline diamond (PCD) material.

As best seen in FIG. 2, the cutting head 16 includes a forward cutting end 26 that includes a dish angle 28 with respect to the end face. In one embodiment, the dish angle 28 can range from about 2 degrees to about 6 degrees, and preferably about 4 degrees. The cutting head 16 also includes a corner radius 30 that is about 3 to about 8 percent of the cutting diameter 24. The radius of curvature of the corner radius 30 depends on the cutting diameter 24. For example, in one embodiment, the radius of curvature of the corner radius 30 is about 0.02 inches (0.51 mm) for a cutting diameter 24 of approximately 0.28 inches (7.11 mm). The cutting head 16 also includes an outer surface 32 that extends from the corner radius 30 to a back radius 34, which causes reduction in diameter from the cutting head 16 to the neck 14. The outer surface 32 can be substantially planar or can be curved (having a radius). In one embodiment, the back radius 34 is about 0.16 inches (4.06 mm) for a cutting diameter of approximately 0.28 inches (7.11 mm) and a neck diameter 22 of approximately 0.22 inches (5.59 mm).

In general, the end mill 10 has a dish angle 28 between about 2 degrees to about 6 degrees, a helix angle 44 between about 5 degrees to about 45 degrees, an end teeth radial rake angle 46 between about −10 degrees to about 15 degrees, a peripheral teeth radial rake angle 47 between about 4 degrees to about 16 degrees; a gashing axial rake angle 48 between about 3 degrees to about 15 degrees, and a primary clearance angle 50 between about 10 degrees to about 25 degrees.

One aspect of the invention is that the forward cutting end 26 includes a radiussed or convexly curved section 29 located between the longitudinal axis 18 and the corner radius 30. The magnitude of the radius of the convexly curved section 29 depends on the cutting diameter 24. In one embodiment, the radius of the convexly curved section 29 is about 0.61 inches (15.46 mm) for a cutting diameter 24 of approximately 0.25 inches (6.31 mm).

During an orbital drilling operation, the forward cutting end 26 first comes into contact with the workpiece at an initial contact area 31, which is between about one-half of the distance between the longitudinal axis 18 and the corner radius 30. For example, in one embodiment, the initial contact area 31 is located at a distance of about 0.124 inches (3.15 mm) from the longitudinal axis 18 to the corner radius 30 for a cutting diameter of about 0.248 inches (6.3 mm). It will be appreciated that the initial contact area 31 can be located about one-third to about two-thirds of the distance from the longitudinal axis 18 to the corner radius 30, depending on the cutting diameter of the cutting head 16.

Because of the convexly curved section 29 of the forward cutting end 26, the material being removed between the initial contact area 31 and the corner radius 30 by the end mill 10 tends to travel radially outward toward the corner radius 30, thereby minimizing the accumulation of the workpiece material in a central portion 26a of the forward cutting end 26. As a result, the convexly curved section 29 of the invention enables smooth drilling of the workpiece material, especially in layered materials without separating the layers. In addition, the convexly curved section 29 of the invention enables penetration through layers of the workpiece without the formation of a material cap when the portion of the forward cutting end 26 proximate the longitudinal axis 18 comes into contact with the workpiece material. By contrast, the material removed from the workpiece in the conventional end mill tends to flow radially inward (in an opposite direction) and accumulates in the central portion 106a of the cutting head 106.

Figure 3:
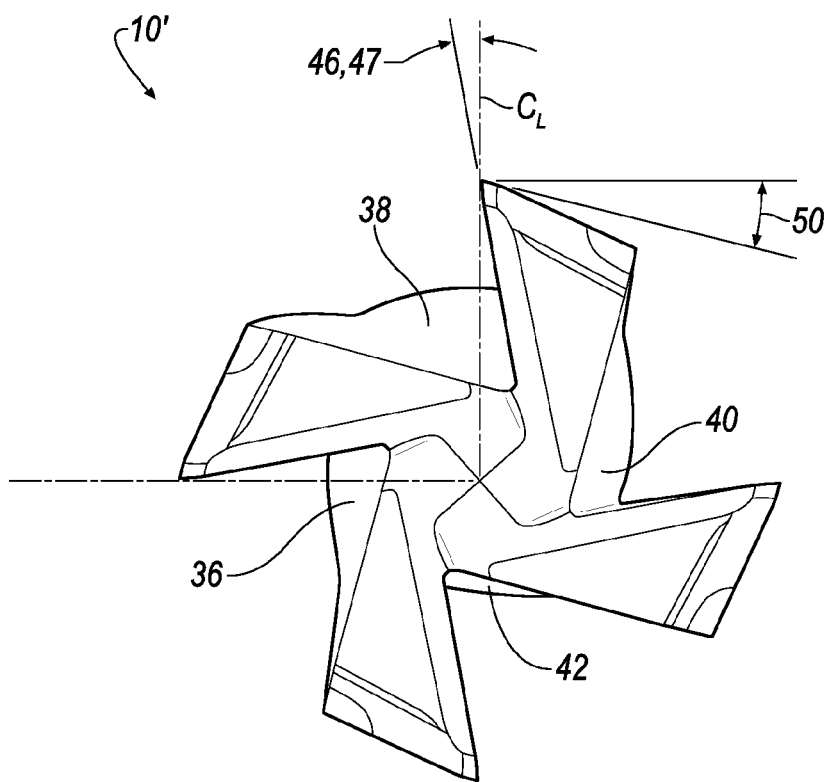
FIG. 3 is an end view of a 4-fluted, non-center cutting end mill according to an embodiment of the invention.
Figure 4:
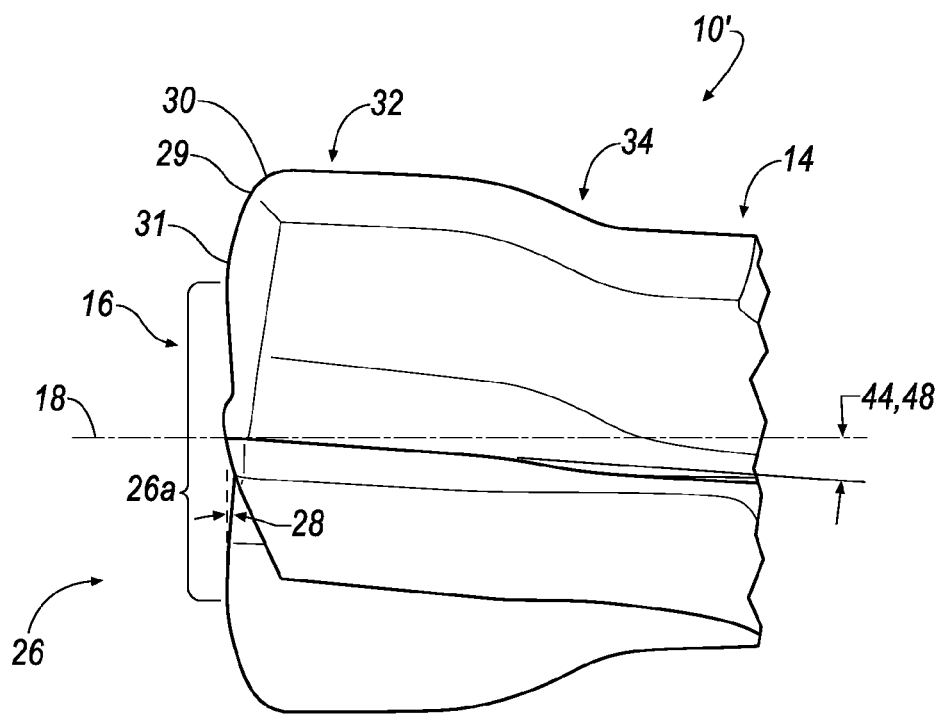
FIG. 4 is a partial side view of the 4-fluted, non-center cutting end mill of FIG. 3.

The various aspects of the invention described above can be applied to various cutting tool configurations. In one example shown in FIGS. 3 and 4, these aspects of the invention were applied to a non-center cutting end mill 10' that includes four flutes, 36, 38, 40, 42, at a helix angle 44 that is about 10 degrees with respect to the longitudinal axis 18. In addition, the end mill 10' includes, but is not limited to, a dish angle 28 of about 4 degrees, an end teeth radial rake angle 46 of about 10 degrees, a peripheral teeth radial rake angle 47 of about 10 degrees, a gashing axial rake angle 48 of about 5 degrees, and a primary clearance angle 50 of about 12 degrees. It is noted that the end teeth radial rake angle 46 is approximately equal to the peripheral teeth radial rake angle 47.

Figure 5:
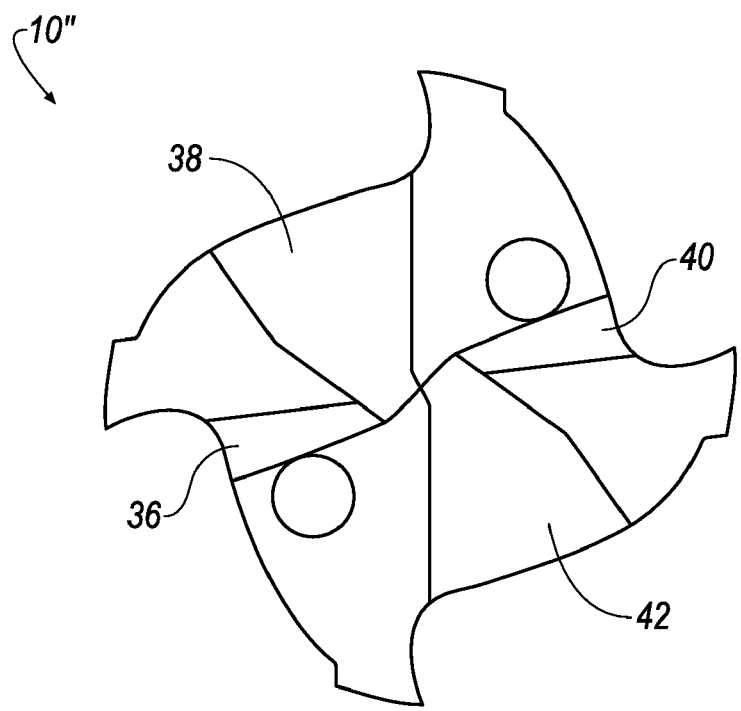
FIG. 5 is an end view of a 4-fluted center cutting end mill according to an embodiment of the invention.
Figure 6:
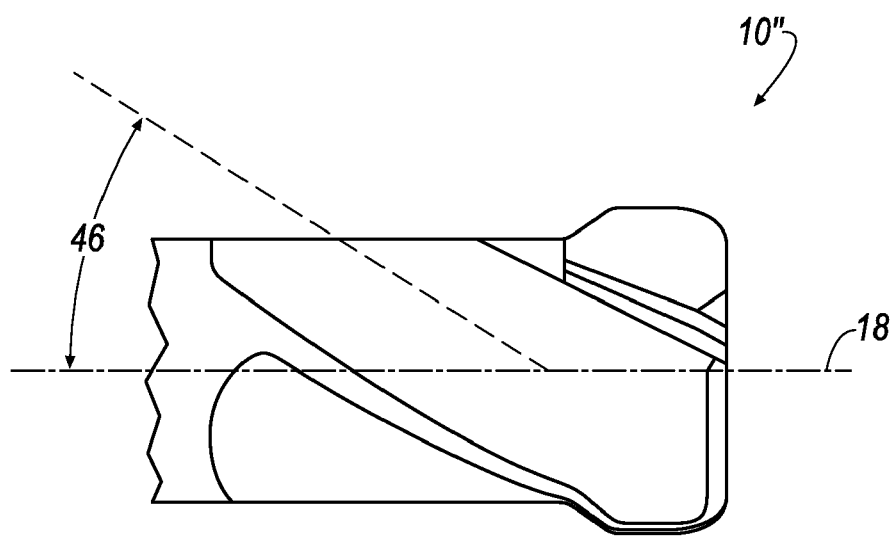
FIG. 6 is a partial side view of the 4-fluted center cutting end mill of FIG. 5.
Figure 7:
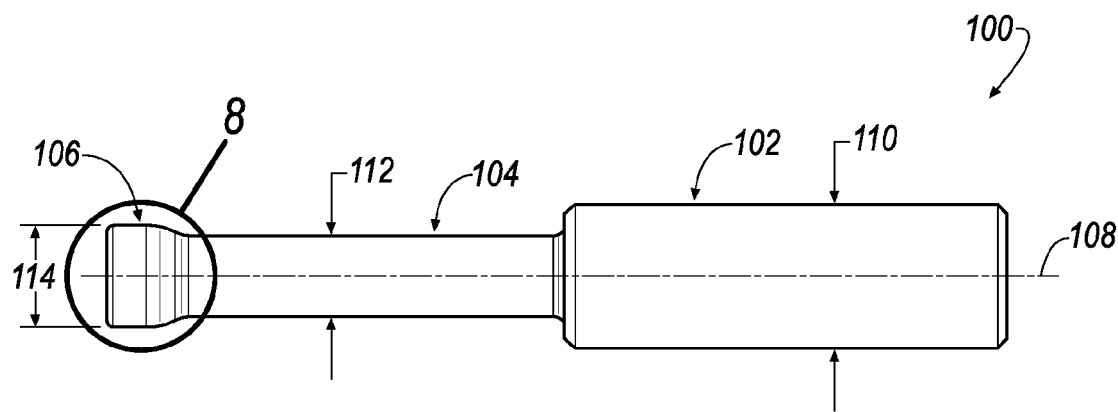
FIG. 7 is a side view of the geometry of a conventional end mill for orbital hole making.
Figure 8:
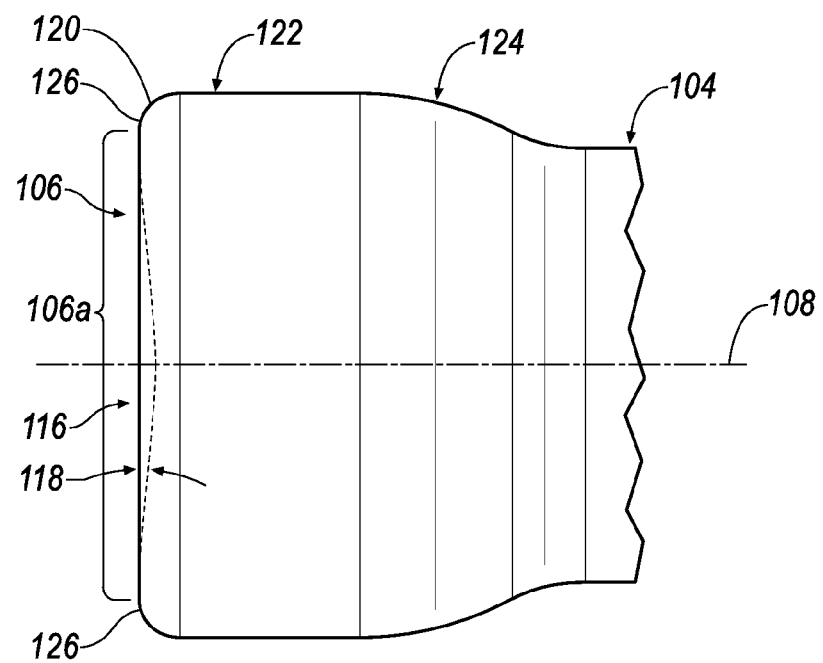
FIG. 8 is an enlarged side view of the cutting head of the end mill of FIG. 7.
Figure 9:
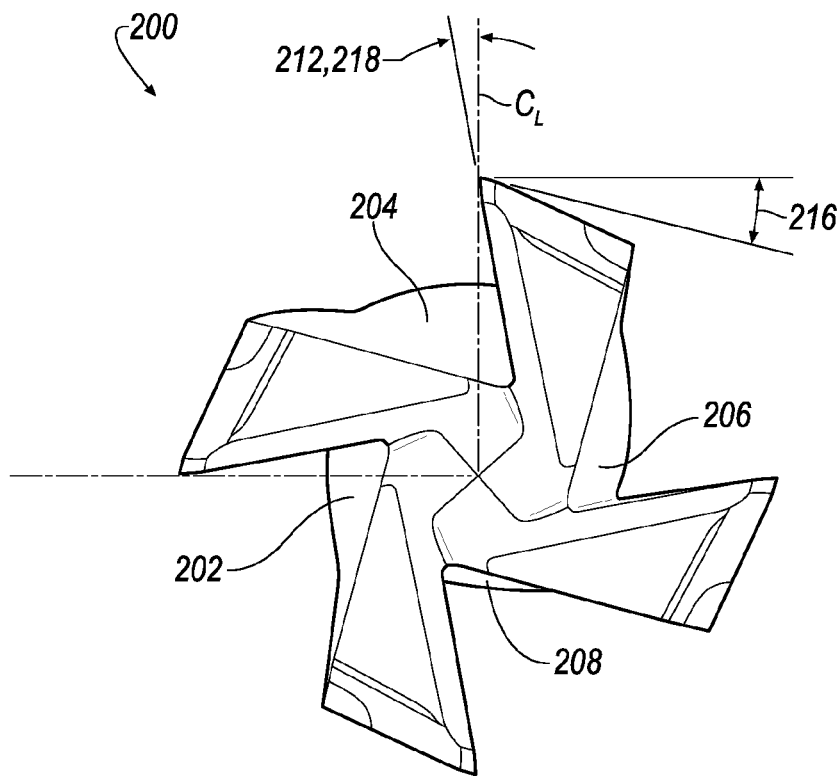
FIG. 9 is an end view of a conventional 4-fluted, non-center cutting end mill for orbital hole making.
Figure 10:
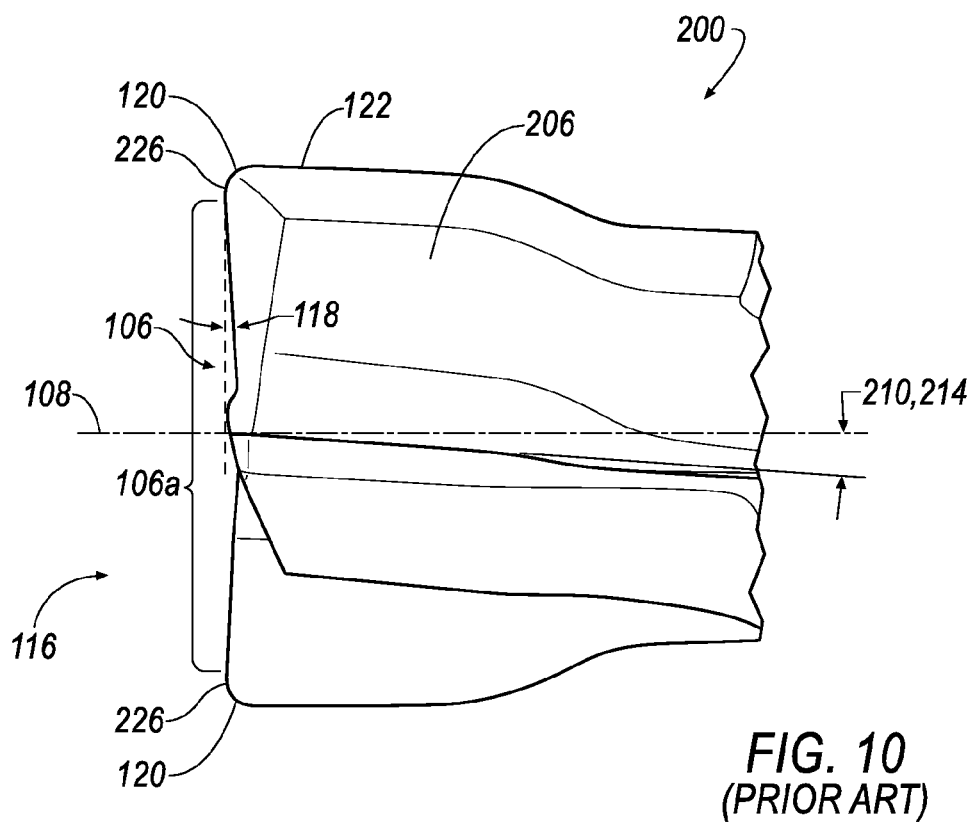
FIG. 10 is a partial side view of the 4-fluted, non-center cutting end mill of FIG. 9.

The various aspects of the invention described above can also be applied to a center cutting end mill 10", as shown in FIGS. 5 and 6. In the illustrated example, the center cutting end mill 10" has a similar geometry, such as helix angle, dish angle, radial rake angle, gashing axial rake angle, primary clearance angle, and the like, as the non-center cutting end mill 10', and will not be described in further detail here.

As described above, the radiussed or convexly curved section 29 of the invention enables smooth drilling of the workpiece material, especially in layered materials without separating the layers. In addition, the convexly curved section 29 of the invention enables penetration through layers of the workpiece without the formation of a material cap when the portion of the forward cutting end 26 proximate the longitudinal axis 18 comes into contact with the workpiece material. It will be appreciated that the principles of the tool geometry can be applied to both non-center cutting and center cutting end mills for orbital drilling of materials, and in particular, layered materials.

The documents, patents and patent applications referred to herein are hereby incorporated by reference.

While the invention has been specifically described in connection with certain specific embodiments thereof, it is to be understood that this is by way of illustration and not of limitation, and the scope of the appended claims should be construed as broadly as the prior art will permit.

What is claimed is:

1. An end mill for orbital drilling comprising a shank having a shank diameter; a neck having a neck diameter; a cutting head having a cutting diameter; a corner radius; a dish angle; and a longitudinal axis, the cutting head including a forward cutting end having a convexly curved section located between the longitudinal axis and the corner radius, wherein the convexly curved section causes material removed from a workpiece to flow radially outward from an initial contact area toward the corner radius, thereby minimizing an accumulation of material in a central portion of the forward cutting end.

2. The end mill according to claim 1, wherein the initial contact area is located between about one-third to about two-thirds of a distance between the longitudinal axis and the corner radius.

3. The end mill according to claim 1, wherein the neck diameter is about 65 percent to about 90 percent of the cutting diameter, the dish angle is between about 2 degrees to about 6 degrees, and the corner radius is between about 3 percent to about 8 percent of the cutting diameter.

4. The end mill according to claim 1, further comprising a plurality of flutes formed at a helix angle of between about 5 degrees to about 18 degrees.

5. The end mill according to claim 1, further comprising an end teeth radial rake angle between about −10 degrees to about 15 degrees, and a peripheral teeth radial rake angle between about 4 degrees to about 16 degrees.

6. The end mill according to claim 1, further comprising a gashing axial rake angle between about 3 degrees to about 15 degrees.

7. The end mill according to claim 1, further comprising a primary clearance angle between about 10 degrees to about 25 degrees.

8. The end mill according to claim 1, wherein the end mill is made of a substrate comprised of tungsten carbide cemented with cobalt in a range between about 3 wt. % to about 15 wt. %.

9. The end mill according to claim 1, wherein the end mill comprises a center cutting end mill.

10. The end mill according to claim 1, wherein the end mill comprises a non-center cutting end mill.

11. An end mill for orbital drilling comprising a shank having a shank diameter; a neck having a neck diameter; a cutting head having a cutting diameter; a corner radius; a dish angle; a plurality of flutes; and a longitudinal axis, the cutting head including a forward cutting end having a convexly curved section located between the longitudinal axis and the corner radius, wherein the convexly curved section causes material removed from a workpiece to flow radially outward from an initial contact area toward the corner radius, thereby minimizing an accumulation of material in a central portion of the forward cutting end.

12. The end mill according to claim 11, wherein the initial contact area is located between about one-third to about two-thirds of a distance between the longitudinal axis and the corner radius.

13. The end mill according to claim 11, wherein the plurality of flutes are formed at a helix angle of between about 5 degrees and about 18 degrees.

14. The end mill according to claim 11, wherein the end mill is made of a substrate comprised of tungsten carbide cemented with cobalt in a range between about 3 wt. % to about 10 wt. %.

15. The end mill according to claim 11, wherein the end mill further includes an end teeth radial rake angle between about −10 degrees to about 15 degrees; a peripheral teeth radial rake angle between about 4 degrees to about 16 degrees; a gashing axial rake angle between about 3 degrees to about 15 degrees; and a primary clearance angle between about 10 degrees to about 25 degrees.

16. The end mill according to claim 11, wherein the end mill comprises a center cutting end mill.

17. The end mill according to claim 11, wherein the end mill comprises a non-center cutting end mill.

* * * * *